United States Patent
Karaoguz et al.

(10) Patent No.: US 8,108,145 B2
(45) Date of Patent: *Jan. 31, 2012

(54) DOWNLOADING MAP SEGMENT(S) TO A CELL PHONE BASED UPON ITS GPS COORDINATES AND MOBILITY

(75) Inventors: Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/089,394

(22) Filed: Apr. 19, 2011

(65) Prior Publication Data

US 2011/0196609 A1 Aug. 11, 2011

Related U.S. Application Data

(63) Continuation of application No. 12/605,911, filed on Oct. 26, 2009, now Pat. No. 7,941,272, which is a continuation of application No. 12/104,370, filed on Apr. 16, 2008, now Pat. No. 7,610,149, which is a continuation of application No. 11/750,396, filed on May 18, 2007, now Pat. No. 7,366,610, which is a continuation of application No. 11/069,532, filed on Mar. 1, 2005, now Pat. No. 7,236,882.

(60) Provisional application No. 60/647,222, filed on Jan. 26, 2005.

(51) Int. Cl.
  *G01C 21/30* (2006.01)
(52) U.S. Cl. .................. 701/213; 701/211; 340/995.12
(58) Field of Classification Search .................. None
See application file for complete search history.

(56) References Cited

U.S. PATENT DOCUMENTS

| 6,324,467 | B1 * | 11/2001 | Machii et al. | 701/200 |
| 7,414,637 | B2 * | 8/2008 | Fogel et al. | 345/629 |

* cited by examiner

*Primary Examiner* — Michael J. Zanelli
(74) *Attorney, Agent, or Firm* — Garlick Harrison & Markison; Bruce E. Garlick (57) ABSTRACT

A wireless terminal displays its location and navigation information (map segment) on its display. The wireless terminal accesses a Global Positioning System (GPS) receiver of the wireless terminal to determine its location coordinates. The wireless terminal determines a maximum data size for navigation information to be downloaded. The wireless terminal sends a navigation information download request to a map server via a supporting wireless network infrastructure that includes the location coordinates and the maximum data size. The wireless terminal receives navigation information that has a data size no greater than the maximum data size and displays the navigation information on the display. The wireless terminal may display a map segment and an icon representing the wireless terminal at a location corresponding to the location coordinates of the wireless terminal with respect to the map segment. The wireless terminal may download a premises map from a premises map server.

27 Claims, 11 Drawing Sheets

DOWNLOADING MAP SEGMENT(S) TO A CELL PHONE BASED UPON ITS GPS COORDINATES AND MOBILITY

CROSS REFERENCE TO RELATED APPLICATION

This application is a continuation of U.S. Ser. No. 12/605,911, filed Oct. 26, 2009, which is a continuation of U.S. Ser. No. 12/104,370, filed Apr. 16, 2008, now issued as U.S. Pat. No. 7,610,149, which is a continuation of U.S. Ser. No. 11/750,396, filed May 18, 2007, now issued as U.S. Pat. No. 7,366,610, which is a continuation of U.S. Ser. No. 11/069,532, filed Mar. 1, 2005, now issued as U.S. Pat. No. 7,236,882, which claims priority to U.S. Provisional Patent Application Ser. No. 60/647,222, filed Jan. 26, 2005, all of which are incorporated herein by reference in their entirety for all purposes.

FIELD OF THE INVENTION

The present invention relates generally to wireless communications; and more particularly to operations relating to the location/mobility of a wireless terminal.

BACKGROUND OF THE INVENTION

Communication systems are well known. Communication systems include both wired communication systems and wireless communication systems. Wired communication systems include the Public Switched Telephone Network (PSTN), Wide Area Networks (WANs), Local Area Networks (LANs), and other networks that use wired or optical media for the transmission of data. Wireless communication systems include cellular telephone systems, satellite communication systems, Wireless Local Area Networks (WLANs), Wireless Personal Area Networks (WPANs), and other networks that employ a wireless link between a serviced terminal and a network infrastructure. Of course, many communications are serviced using a combination of wireless communication systems and wired communication systems.

Mobile navigation systems for automotive applications have become quite popular. With these automobile based navigation systems, an optical media is employed to store map information used for navigation purposes, e.g., road information, address information, etc. Such map information is quite voluminous, often requiring many CDs to store. Hand-held Global Positioning System (GPS) terminals have been available for some time and are commonly used. These hand-held GPS terminals typically have minimal storage capacity for maps making them have limited functionally for navigation purposes. Thus, there is a need in the art for techniques for utilizing a wireless terminal with limited storage capabilities for navigational purposes.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
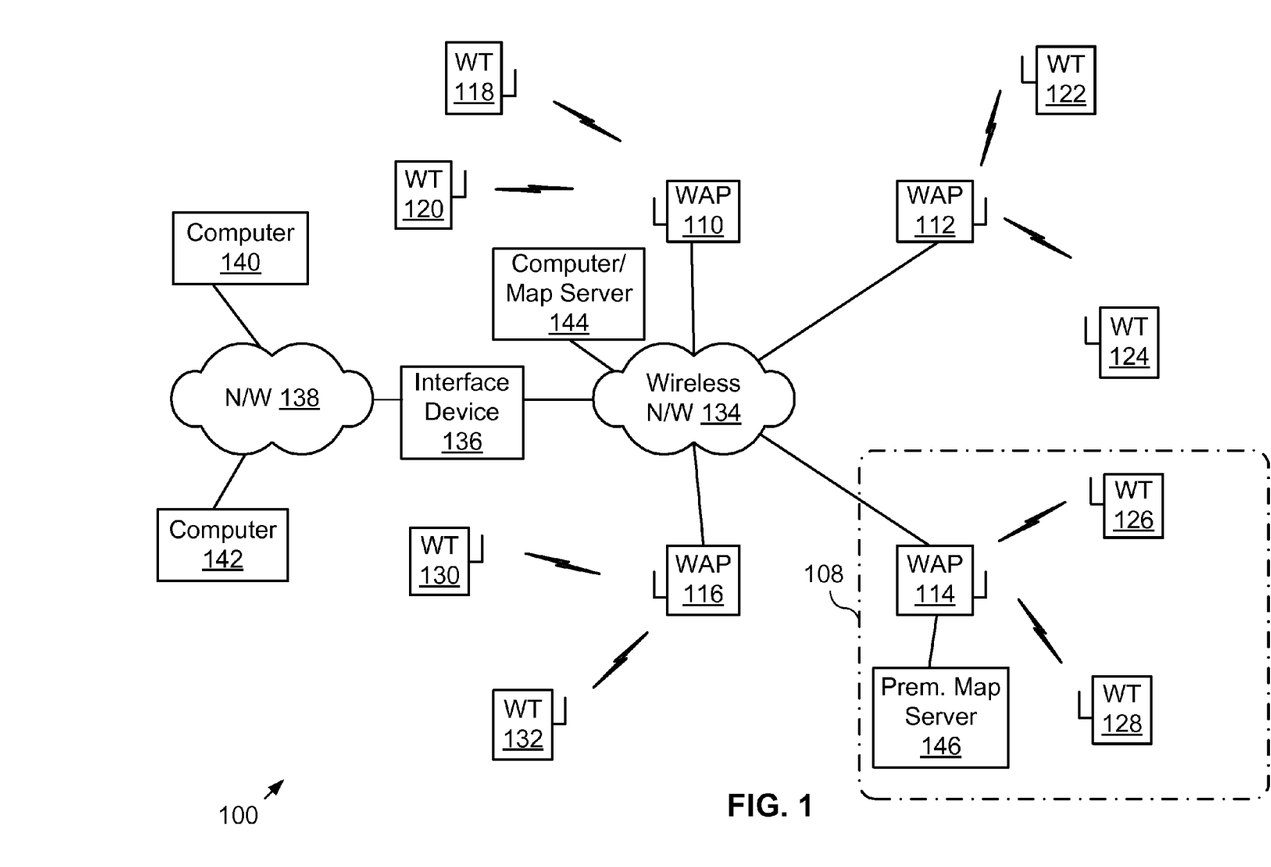
FIG. 1 is a system diagram illustrating a wireless communication system that operates according to the present invention.

FIG. 1 is a system diagram illustrating a wireless communication system that operates according to the present invention. The wireless communication system 100 of FIG. 1 includes one or more servicing base stations and/or wireless access points (WAPs) 110, 112, 114, and 116. The reader should understand that the structure of FIG. 1 is used only to convey the principles of the present invention and is not intended to be a detailed description of a cellular wireless communication system, a Wireless Local Area Network (WLAN), a Wireless Wide Area Network (WWAN), or a Wireless Personal Area Network (WPAN).

As is shown, base station/WAP 110 supports wireless terminals 118 and 120 within a respective serving area, e.g., cell, sector, premises, area, etc Likewise, base station/WAP 112 supports wireless terminals 122 and 124, base station/WAP 114 supports wireless terminals 126 and 128, and base station/WAP 116 supports wireless terminal 130 and 132. The base stations/WAPs 110, 112, 114, and 116 are serviced via network backbone 134 and interface device 136. The interface device 136 couples the wireless backbone network 134 to another network 138. The another network 138 may include a Local Area Network (LAN), a Wide Area Network (WAN), the Internet, or any other type of network that couples the wireless backbone network backbone 134 via the network interface 136 to computers or terminals 140, 142, and 142, one, some or all of which may be map servers.

The operation of the wireless communication system 100 and of the wireless terminals 118-132 supported thereby will be described further with reference to FIGS. 2-7 and 9-10. The structure of the wireless terminals 118-132 will be described further with reference to FIG. 8. Generally, according to a first embodiment, a wireless terminal 118 is operable to download and display navigation information on a display of the wireless terminal. The navigation information may include text instructions for reaching a desired destination, a combination of textual and graphical information for reaching a desired destination, a map segment, an icon that represents a location of the wireless terminal on the map segment, an icon that represents a location of a desired destination on the map segment, or other navigation information.

Operation commences with the wireless terminal 118 accessing a Global Positioning System (GPS) receiver of the wireless terminal 118 to determine its location coordinates. Then, the wireless terminal 118 determines a maximum data size for navigation information to be downloaded. The wireless terminal 118 then sends a navigation information download request to a server, e.g., 144 via a supporting wireless network infrastructure 134. The navigation information download request includes the location coordinates and the maximum data size. The supporting wireless network infrastructure 134 may be a cellular telephone network infrastructure, a WLAN infrastructure, a WPAN infrastructure, or another supporting wireless network infrastructure. In another embodiment, network 138 and device 136 support interaction with map server 140 and/or 142.

Operation continues with the wireless terminal 118 downloading navigation information corresponding to the location coordinates of the wireless terminal 118 (and also to the desired destination). The navigation information has a data size no greater than the maximum data size. The operation concludes with the wireless terminal 118 displaying the navigation information on its display. Such operation may include displaying a map segment, an icon that represents the wireless terminal 118 on the map segment, and/or an icon that represents the desired destination on the display. The icons displayed on the map segment are displayed at locations corresponding to the location coordinates of the wireless terminal 118 with respect to the map segment and of the desired destination with respect to the map segment. These operations will be described further with reference to FIG. 2.

In its operation, the wireless terminal 118 will download additional information, e.g., additional map segments, when required for continued mapping/navigation operations. Thus, operation may also include the wireless terminal 118 determining a map segment downloading latency. With this operation, the wireless terminal 118 determines a rate of motion of the wireless terminal. The wireless terminal 118 then estimates a duration of time when future location coordinates of the wireless terminal 118 will depart from a current map segment. Then, when the map segment downloading latency compares unfavorably to the duration of time, the wireless terminal 118 sends a subsequent map segment download request to the map server 144 via the wireless network infrastructure 134. In response, the wireless terminal 118 receives a subsequent map segment that it stores in its memory. These operations will be described further with reference to FIGS. 3A and 3B

The operation of the present invention may include a compass mode feature. With such compass mode feature, the wireless terminal 118 determines an orientation of the wireless terminal 118 with respect to a reference direction, e.g., north. Operation includes then orienting the map segment on the display of the wireless terminal 118 based upon the orientation of the wireless terminal 118 so that the map segment is displayed a the correct orientation with reference to mapped physical features. These operations will be described further with reference to FIGS. 5-7.

According to another embodiment of the present invention, a wireless terminal 126 displays a premises map segment for use by a user of the wireless terminal 126 while within a corresponding premises 108. Operation commences with the wireless terminal 126 detecting its entering a premises serviced by a premises Wireless Access Point (WAP) 114. With the second embodiment, component 114 is considered the premises WAP 114. The premises WAP 114 may operate according to a WLAN interface standard or a WPAN interface standard, for example. Operation continues with the wireless terminal 126 establishing wireless communications with the premises WAP 114. Once the communications are established, the wireless terminal 126 establishes communications with a premises map server, e.g., 144 or 146, via the premises WAP 114. The premises map server 144 or 146 may be coupled to the premises WAP via a servicing network 134. Then, the wireless terminal 126 downloads a premises map from the map server 144 or 146 via the premises WAP 114. Operation concludes with the wireless terminal 126 displaying the premises map on the display. Operation according to the second embodiment of the present invention may include the wireless terminal 126 accessing a GPS receiver to determine its location coordinates. Further, the wireless terminal 126 may display an icon upon the premises map to indicate a relative position of the wireless terminal 126.

In establishing wireless communications with the premises WAP 114, the wireless terminal 126 may first detect the premises WAP 114. The wireless terminal 126 may then query the premises WAP 114 to request access to the premises WAP 114. Then, the wireless terminal 126 would receive an access grant from the premises WAP 114 such that it may establish communications and be serviced by the premises WAP 114. Once communication is established, the wireless terminal 126 may discover the premises map server 144 or 146 based upon interaction with the premises WAP 114. After discovery, the wireless terminal 126 may then send a premises map download request to the premises map server 144 or 146 via the premises WAP 114. In response, the wireless terminal 126 would download the premises map from the premises map server 144 or 146 via the premises WAP 114. The second embodiment may also employ the compass mode features previously described.

Both the first and second embodiment may include the wireless terminal 118 or 126 downloading a map segment that includes a plurality of points-of-interest. This plurality of points-of-interest may include physical features, meeting places, and other features. The map or map segment may also include GPS coordinates, respected to the plurality of points-of-interest. In this case, the user of the wireless terminal may navigate to reach particular points-of-interest.

Figure 2:
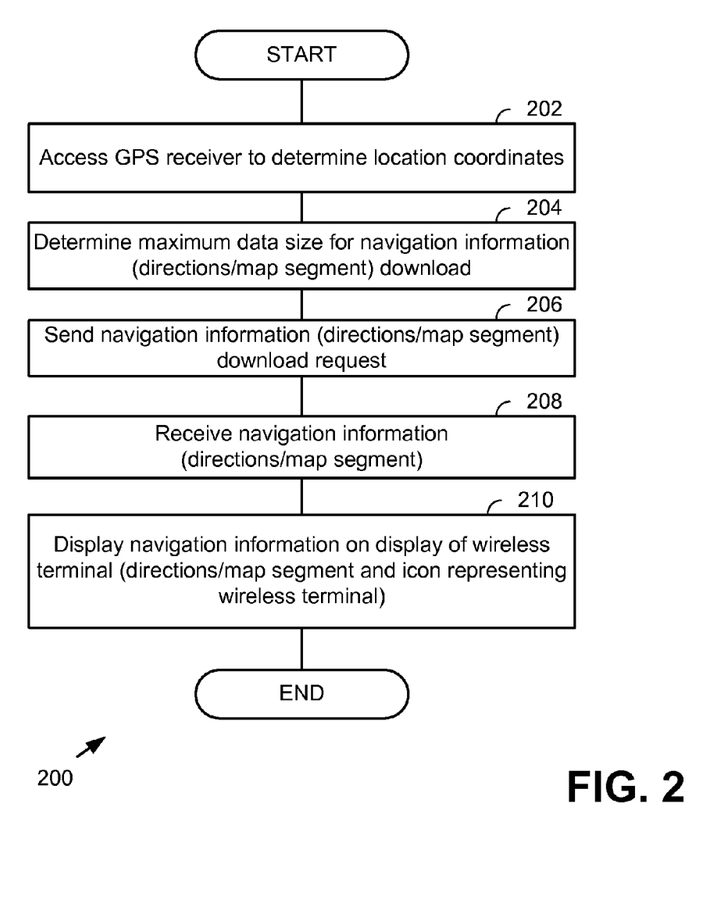
FIG. 2 is a flow chart illustrating a first embodiment of the present invention for operating a wireless terminal.

FIG. 2 is a flow chart illustrating a first embodiment of the present invention for operating a wireless terminal. Operation 200 commences with the wireless terminal accessing a global positioning system (GPS) receiver of the wireless terminal to determine location coordinates of the wireless terminal (Step 202). Operation continues in determining a maximum data size for a navigation information download (Step 204). The navigation information may include directions in a graphical and/or textual format, a map segment of varying detail, or other navigation information. Operation continues with sending a navigation information download request to a map server via a supporting wireless network infrastructure (Step 206). The navigation information download request includes the location coordinates and the maximum data size.

Determining a maximum data size for the navigation information download at Step 204 may include determining a data size of currently available memory and then estimating a data size required for other application uses. Then, this operation may include determining the maximum data size from the navigation information download based upon the size of the currently available memory and the data size required for other application uses. This operation may also include determining additional memory that will be available when overwriting all or a portion of navigation information that is currently loaded in the wireless terminal's memory. The wireless terminal may determine that overwriting stored navigation information when the new or subsequent navigation information is downloaded. In order to meet the maximum data size, the server may: (1) select a level of detail of the navigation information to meet the maximum data size; (2) select geographic boundaries of a map segment to meet the maximum data size; (3) select a level of detail of the map segment to meet the maximum data size; (4) select a level of resolution of the map segment to meet the maximum data size; and (5) choose textual navigation information to minimize the size of the navigation information, among other characteristics of the navigation information that affects is size.

Operation continues with the wireless terminal receiving navigation information corresponding to the location coordinates of the wireless terminal and having a data size no greater than the maximum data size (Step 208). The amount of detail and information downloaded as the navigation information depends upon the maximum data size determined by the wireless terminal. Thus, the wireless terminal will be able to store the navigation information in its available memory upon receipt. Operation continues with the wireless terminal displaying the navigation information on its display (Step 210). When the navigation information includes a map segment, the map segment is displayed. Further, icons representing the wireless terminal and a desired destination may be displayed on the map segment at their corresponding location coordinates. In this fashion, the wireless terminal may present to the user his or her current location and of the desired destination on the map segment for subsequent navigation.

Figure 3A:
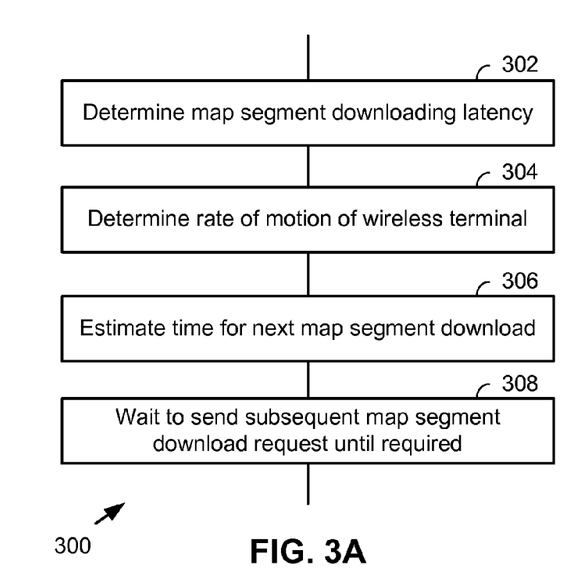
FIG. 3A is a partial flow chart illustration operations of the present invention in downloading map segments.

FIG. 3A is a partial flow chart illustration operations 200 of the present invention in downloading map segments. The wireless terminal first determines a map segment downloading latency (Step 302). The operation of Step 302 will be described further with reference to FIG. 3B. Operation continues in determining a rate of motion of the wireless terminal (Step 304). The wireless terminal may determine its rate of motion via accessing the GPS receiver. Then, the wireless terminal estimates duration of time when future location coordinates of the wireless terminal will depart from a current map segment (Step 306).

By tracking its location over time using the GPS receiver, the wireless terminal may determine approximately its rate of motion and its direction of motion with respect to the map segment. In this case, the wireless terminal will then be able to estimate when its location coordinates will no longer reside on the map segment. When the map segment downloading latency compares unfavorably to the duration of time, the wireless terminal sends a subsequent map segment download request to the map server via the supporting wireless network infrastructure (Step 308). Thus, with the operation of FIG. 3A, the wireless terminal only downloads a subsequent map segment when required. Further, the wireless terminal intelligently waits until the subsequent map segment is needed before sending the subsequent map segment download request.

Figure 3B:
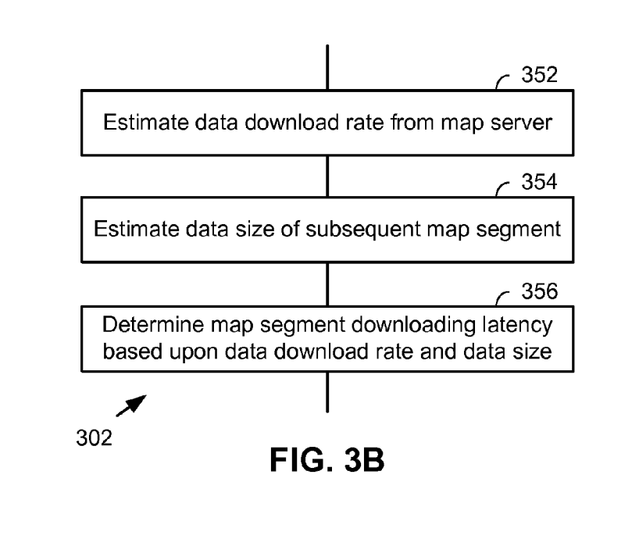
FIG. 3B is a flow chart illustrating operation of the present invention in determining map segment downloading latency.

FIG. 3B is a flow chart illustrating operation 302 of the present invention in determining map segment downloading latency. Such operation includes first estimating a data download rate from the map server (Step 352). In estimating the data download rate from the map server, the wireless terminal may refer to the data download rate of the previous map segment or to multiple previous map segments from the map server. Then, the wireless terminal estimates the data size of the subsequent map segment (Step 354). This estimate may be based upon the size of the previous map segment that was downloaded from the map server. Alternatively, the wireless terminal may estimate the data size based upon its available memory size with such estimate indicated to the map server upon the next map segment download request. Then, the wireless terminal determines the map segment downloading latency based upon the download rate and the data size (Step 356). The principles of FIGS. 3A and 3B may also be applied to other types of navigation information that are downloaded to the wireless terminal.

Figure 4:
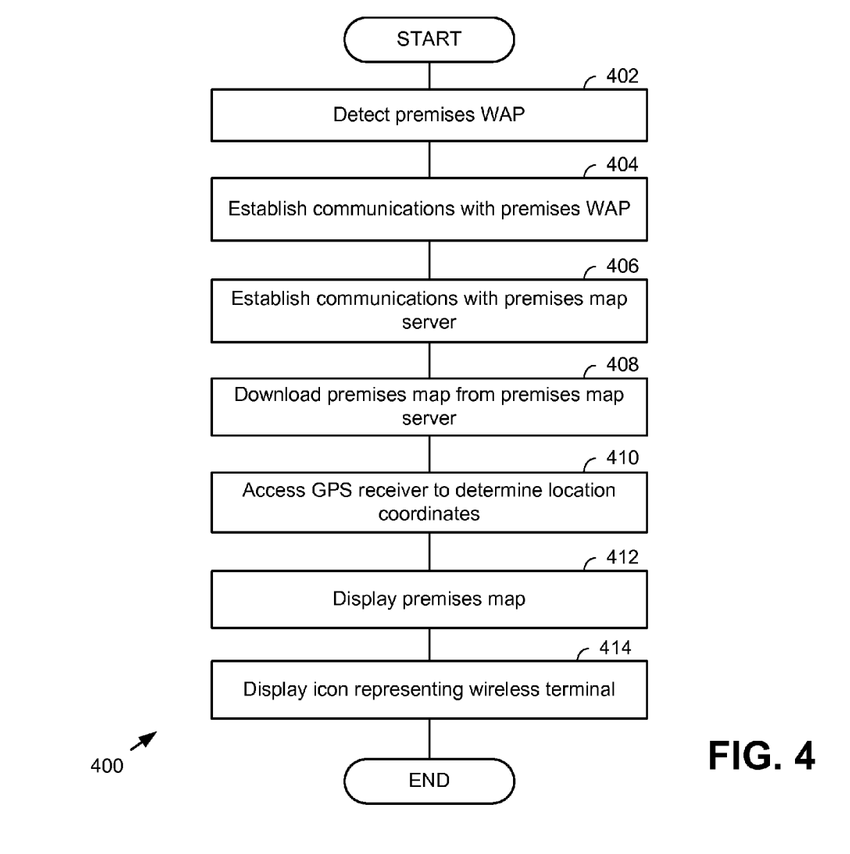
FIG. 4 is a flow chart illustrating a second embodiment of the present invention for operating a wireless terminal.

FIG. 4 is a flow chart illustrating a second embodiment of the present invention for operating a wireless terminal. Operation 400 commences with the wireless terminal detecting the presence of a premises WAP (Step 402). In one particular operation, the wireless terminal detects the premises WAP upon entering a serviced premises by receiving a beacon signal broadcast by the premises WAP. Operation continues with the wireless terminal establishing wireless communications with the premises WAP (Step 404). Then, the wireless terminal establishes communications with a premises map server via the premises WAP (Step 406). As was described with reference to FIG. 1, the map server may couple to a LAN that services the premises. Alternately, the map server may be coupled to the premises WAP via multiple coupling networks. Operation continues with the wireless terminal downloading a premises map from the premises map server via the premises WAP (Step 408). The wireless terminal may then access its GPS receiver to determine its location coordinates (Step 410). The wireless terminal then displays the premises map on its display (Step 412). In the embodiment of FIG. 4, the wireless terminal may also display an icon representing itself on the premises map (Step 414). The principles of FIG. 4 may also be applied to downloading other navigation information regarding the premises, e.g., textual or graphical directions to a particular store in a mall, information regarding stores in a mall, locations of particular points of interest within the premises, etc.

Figure 5:
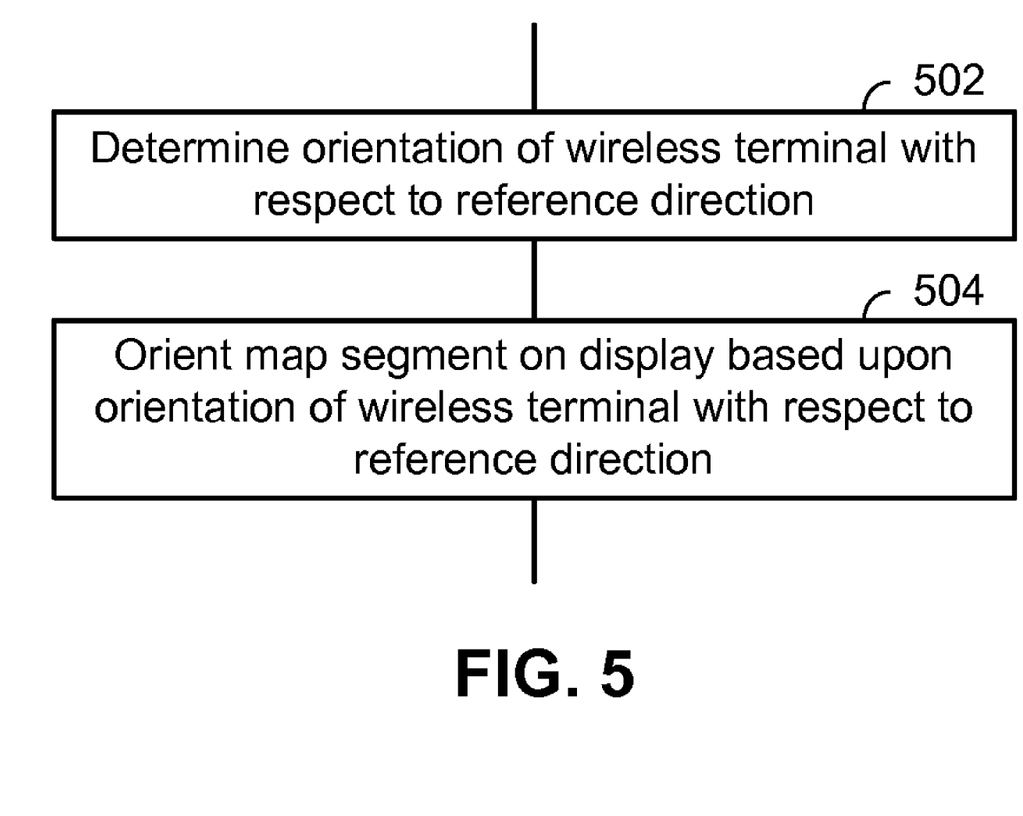
FIG. 5 is a partial flow diagram illustrating compass mode operations according to the present invention.
Figure 6A:
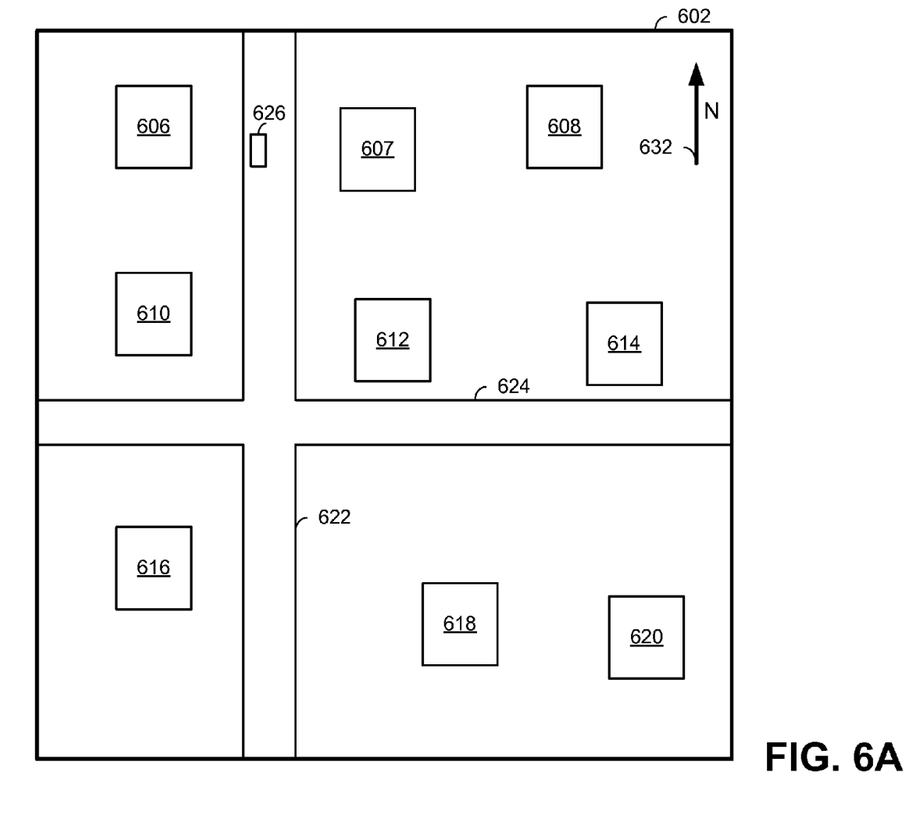
FIG. 6A is a block diagram representing a display of a wireless terminal operating according to the present invention.
Figure 6B:
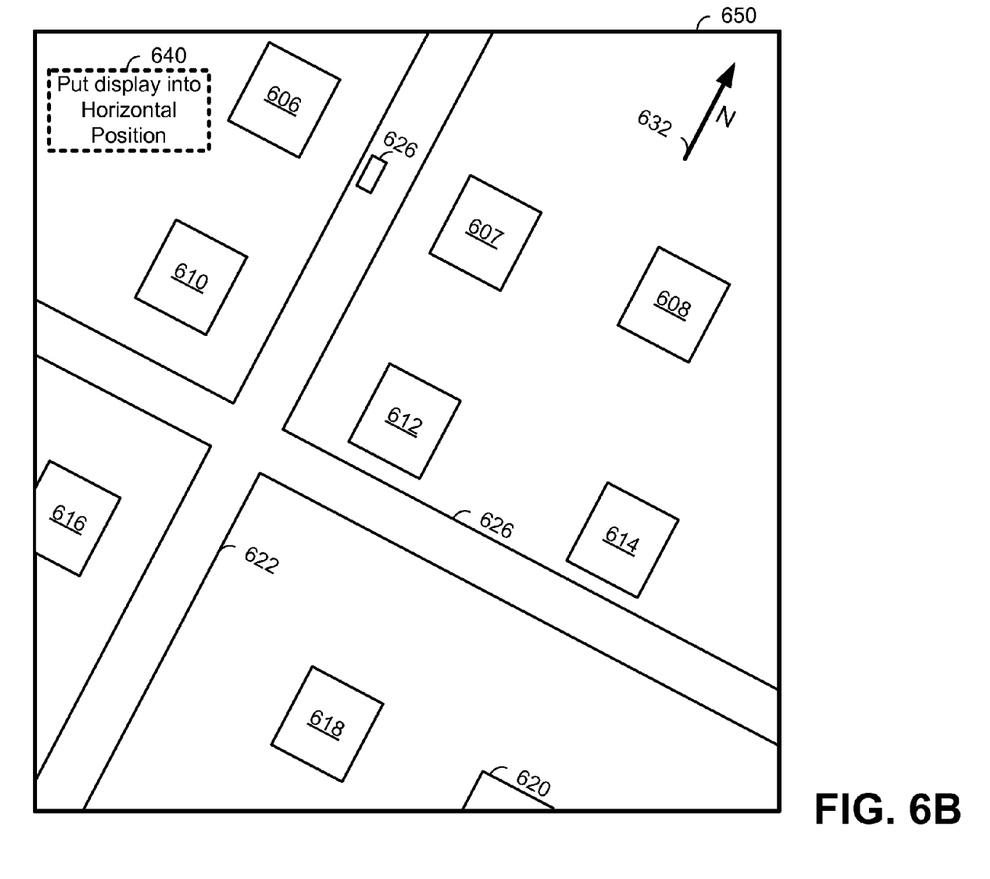
FIG. 6B is a block diagram representing a display of a wireless terminal operating according to the present invention and when in a compass mode.
Figure 7:
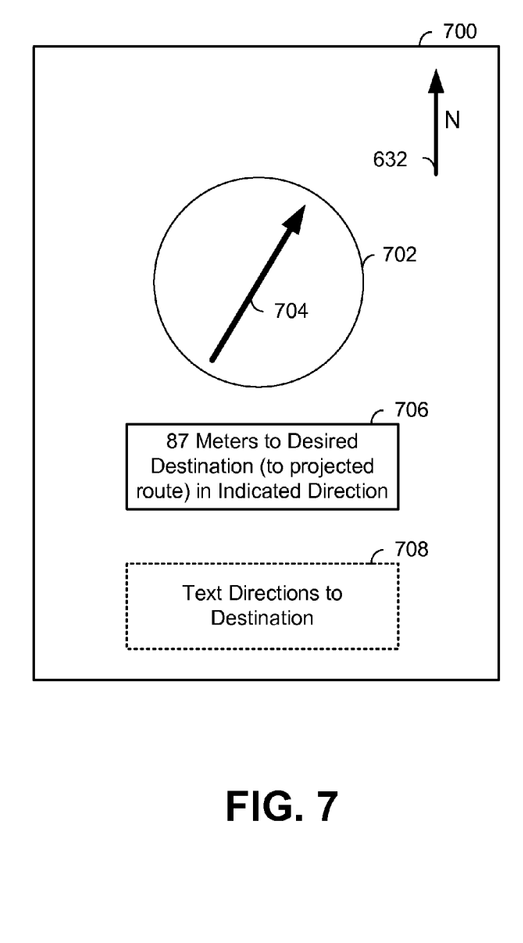
FIG. 7 is a block diagram representing a display operating according to another embodiment of the present invention.

FIG. 5 is a partial flow diagram illustrating "compass mode" operations according to the present invention. With compass mode operations, the wireless terminal determines an orientation of the wireless terminal with respect to a reference direction (Step 502). This reference direction may be magnetic north, actual north, or another reference direction. Typically, this reference direction is determined based upon a magnetic compass, access of the GPS receiver, or by another mechanism supported by the wireless terminal. Based upon the determined orientation, the wireless terminal orients the map segment on the display based upon the orientation of the wireless terminal so that the map segment is displayed in a correct orientation with reference to mapped physical features (Step 504). The operation of Steps 502 and 504 may be performed concurrently with Step 210 of FIG. 2 or with steps 412 and 414 of FIG. 4. FIGS. 6 and 7 illustrate further the teachings of the compass mode feature of FIG. 5.

FIG. 6A is a block diagram representing a display of a wireless terminal operating according to the present invention. As shown in FIG. 6A, the display 602 of the wireless terminal has displayed there upon a map segment along with icons that represent the wireless terminal 626. Shown in the map segment are geographic entities 606, 607, 608, 610, 612, 614, 616, 618, and 620 (referred to hereinafter as 606-620), one of which may be a desired destination. These geographic entities 606-620 may be buildings, parks, landmarks, parking areas, or other geographic features identified within the map segment. The wireless terminal may identify or provide additional information with regard to these geographic features 606-620. The actual size and shape of these geographic features 606-620 may be indicated in more detail than is shown in FIG. 6A. The map segment shown on display 602 also shows roads 622 and 624. The wireless terminal 626 is shown as an icon in the shape of an automobile because it is residing upon road 622. The map segment is shown in one orientation with a reference direction 632 which in the example of FIG. 6A is the direction north.

FIG. 6B is a block diagram representing a display of a wireless terminal operating according to the present invention and when in a compass mode. As shown in FIG. 6B, the map segment on display 650 has been oriented based upon the orientation of the tracking wireless terminal with respect to a reference direction so that the geographic features 606-620 of the map segment are displayed in a correct orientation with reference to the orientation of the wireless terminal. As is shown, the north vector 632 is not oriented vertically on the display 650. Thus, as compared to the display 602 of FIG. 6A, the tracking wireless terminal resides in a different physical orientation with respect to the reference direction 632. The teachings illustrated in FIGS. 6A and 6B may be easily extended to any particular orientation of the tracking wireless terminal. Based upon the particular orientation of the wireless terminal, the reference numerals and information relating to the geographical features may be oriented in different directions for easier access by the user of the tracking wireless terminal.

Note that the operations of FIG. 6B work best when a plane of the display orients substantially in parallel to the surface of the earth. In this orientation, a reference direction of the wireless terminal, e.g., a side of the display 650, may most easily be compared to the reference direction 632. Thus, the display 602 may include a warning 640 directing the user to place the display into a horizontal position. With the display 602 in the horizontal position the geographic features 606-620 of the map segment may be most easily displayed in a correct orientation with reference to the orientation of the wireless terminal. With the display 602 not in a horizontal position, two separate operations may be employed. The relative orientation of the wireless terminal with respect to the reference direction may be best estimated and the display 602 updated based upon the best estimate. Alternately, the wireless terminal may use a last valid estimate of the relative orientation of the wireless terminal with respect to the reference direction.

FIG. 7 is a block diagram representing a display operating according to another embodiment of the present invention. The display includes an indication of the relative position of a desired destination with respect to the wireless terminal. With the particular embodiment illustrated in FIG. 7, a vector 704 contained within a boundary 602 and a distance indication 706 provides the indication. A reference direction 632, e.g., North, may also be provided to the user for additional information. With this information, that is continually updated, a user of the wireless terminal may easily determine the relative position of the wireless terminal to the desired destination. Alternately, or in addition, the display 700 may include thereon textual directions to the intended desired destination. The display of such information would further reduce the download requirements to the wireless terminal from the servicing wireless network.

Figure 8:
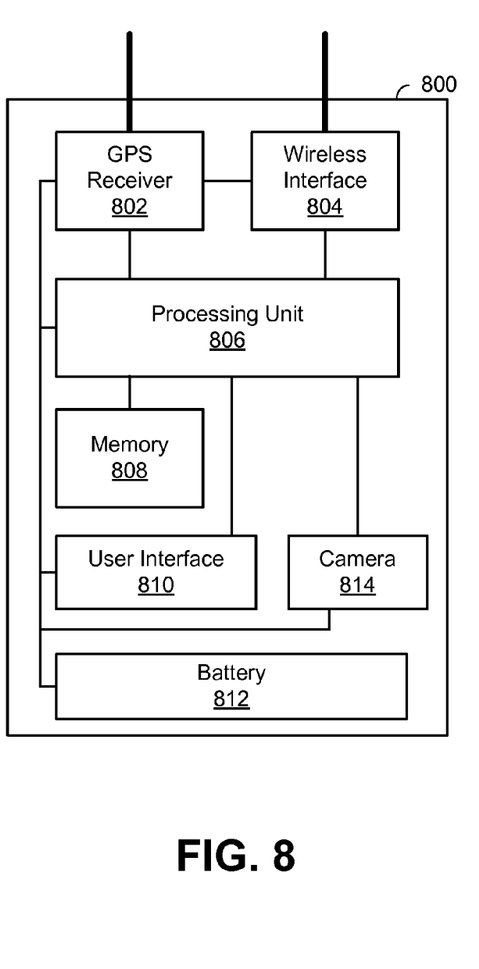
FIG. 8 is a block diagram illustrating a wireless terminal constructed according to the present invention.

FIG. 8 is a block diagram illustrating a wireless terminal constructed according to the present invention. As shown in FIG. 8, the wireless terminal 800 includes a GPS receiver 802, a wireless interface 804, a processing unit 806, memory 808, user interface 810, and a battery 812. The components of the wireless terminal 800 are typically contained within a hard case that provides protection from the elements. The wireless interface 804 will have particular structure and functionality based upon the type of the wireless terminal 800. For example, when the wireless terminal 800 is a cellular telephone, the wireless interface 804 will support a corresponding interface standard e.g., GSM, GPRS, EDGE, UMTS, 1xRTT, 1xEV-DO, 1xEV-DV, etc. The wireless interface 804 of the cellular telephone 804 may also/alternately support WWAN, WLAN, and/or WPAN functionality. When the wireless terminal is a WLAN terminal for example, the wireless interface 804 will support standardized communication according to the IEEE 802.11x group of standards, for example. When the wireless terminal is a WPAN device, the wireless interface 804 would support the Bluetooth interface standard or another WPAN standard such as the 802.15 standard. In any case, the wireless interface 804 may support all or a subset of cellular telephone, WLAN, and WPAN operations.

The processing unit 806 may include any type of processor such as a microprocessor, a digital signal processor, an Application Specific Integrated Circuit (ASIC), or a combination of processing type devices. The processing unit 806 is operable to execute a plurality of software instructions that are stored in memory 808 and downloaded for execution. The processing unit 806 may also include specialized hardware required to implement particular aspects of the present invention. Memory 808 may include SRAM, DRAM, PROM, flash RAM, or any other type of memory capable of storing data and instructions.

A user interface 810 may include a microphone, a speaker, a keypad, a screen, a touch screen, a light, a voice recognition system, an optical recognition system that would authenticate a user's iris, for example, and/or any other type of interface that may be employed in the wireless terminal. In some embodiments, the user interface 810 may include therewith ability to service a headset including microphone and earpiece for the user. In some embodiments of the wireless terminal 800, the user interface 810 is of reduced functionality to minimize the size of the wireless terminal 800. In such case, programming of the wireless terminal 800 may be performed via the wireless interface 804. In such case, the wireless terminal 800 may be small enough to be worn around a child's wrist, around the neck, pinned to the inside of clothing, placed in a pocket, or concealed upon the person. Battery 812 powers the components of the wireless terminal 800.

Figure 9:
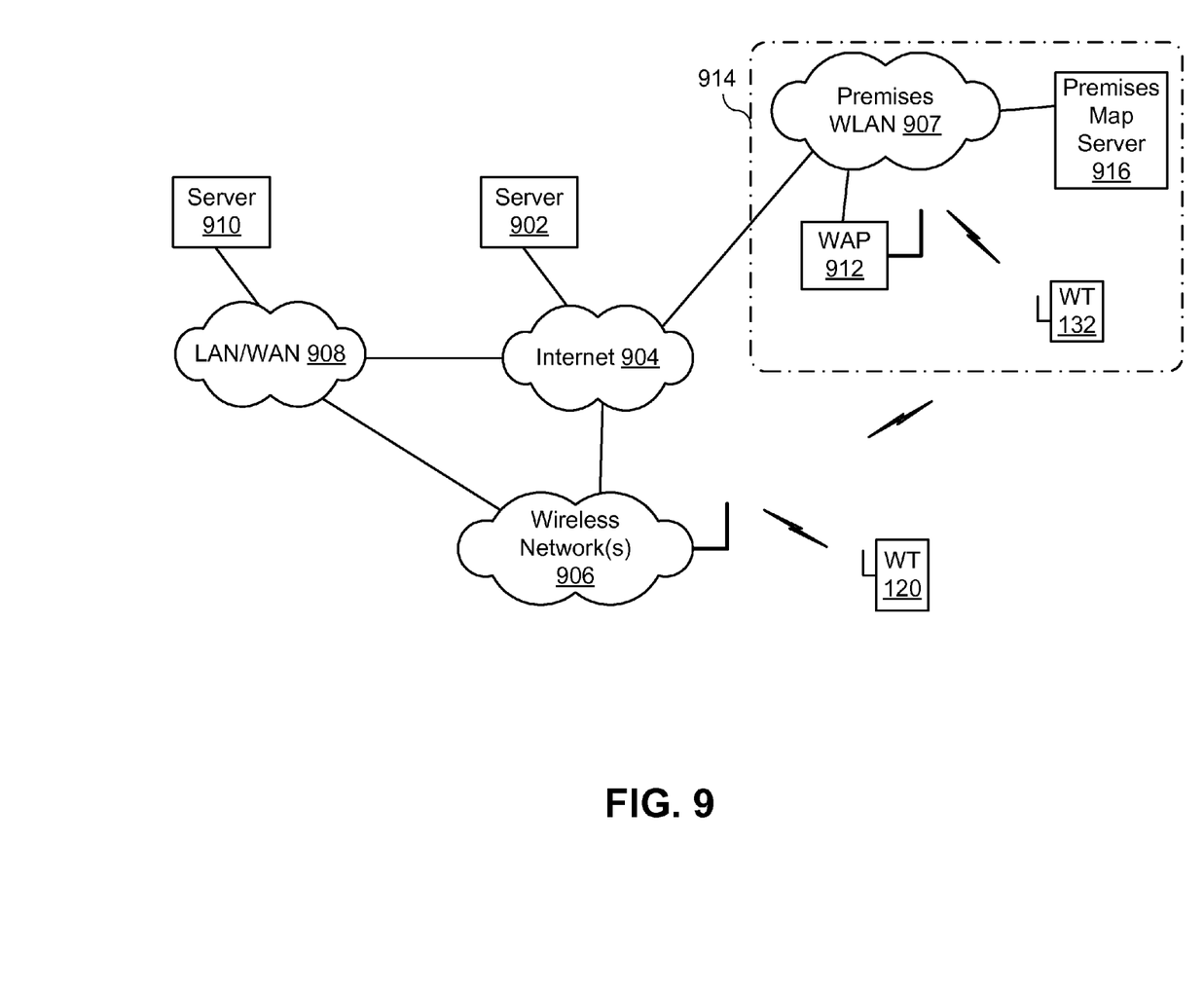
FIG. 9 is a system diagram illustrating a system that may be used according to the present invention.

FIG. 9 is a system diagram illustrating a system that may be used according to the present invention. Referring now to FIG. 9, the operations of both the first embodiment and the second embodiment are illustrated. The system of FIG. 9 includes a server 902, a server 910, a wireless network 906, Internet 904, LAN/WAN 908, premises WLAN 907, premises map server 916, and WAP 912. The premises WAP 912 services premises 914 and supports wireless communications with wireless terminal 132 when located within the premises 914. Wireless network 906 supports wireless communications for both wireless terminal 120 and 132. Wireless network 906 may be a cellular wireless communication system, a WWAN communication system or another wireless communication system that services areas outside of premises 914.

According to the present invention of the first embodiment, server 902 or 910 services navigation information download requests from wireless terminal 120 and/or 132. Thus, the operations of the first embodiment of the present invention may be supported by servers 902, 910, LAN/WAN 908, internet 904 and wireless network 906.

Operations according to the second embodiment of the present invention may be supported by premises WLAN 907, WAP 912, and map server 916. When wireless terminal 132 enters premises 914, it establishes communications with premises WAP 912. Via premises WAP 912, wireless terminal 132 accesses map server 916 via the premises WLAN 907 and WAP 912. Upon this access, the premises map server downloads a premises map to wireless terminal 132 for display on the display of the wireless terminal. This premises map will typically include a plurality of points-of-interest located within premises 914. Premises map would also include GPS coordinates respected to the plurality points-of-interest within the premises 914. Further, the map segment may include offers available within premises. For example, if the premises includes a number of stores and is a shopping mall, the premises map may include special offers not otherwise available causing customer/user of wireless terminal 132 to move to particular stores. The wireless terminal having received the map segment of the premises map from the map server, map server 916, would be able to receive the special offer.

Figure 10:
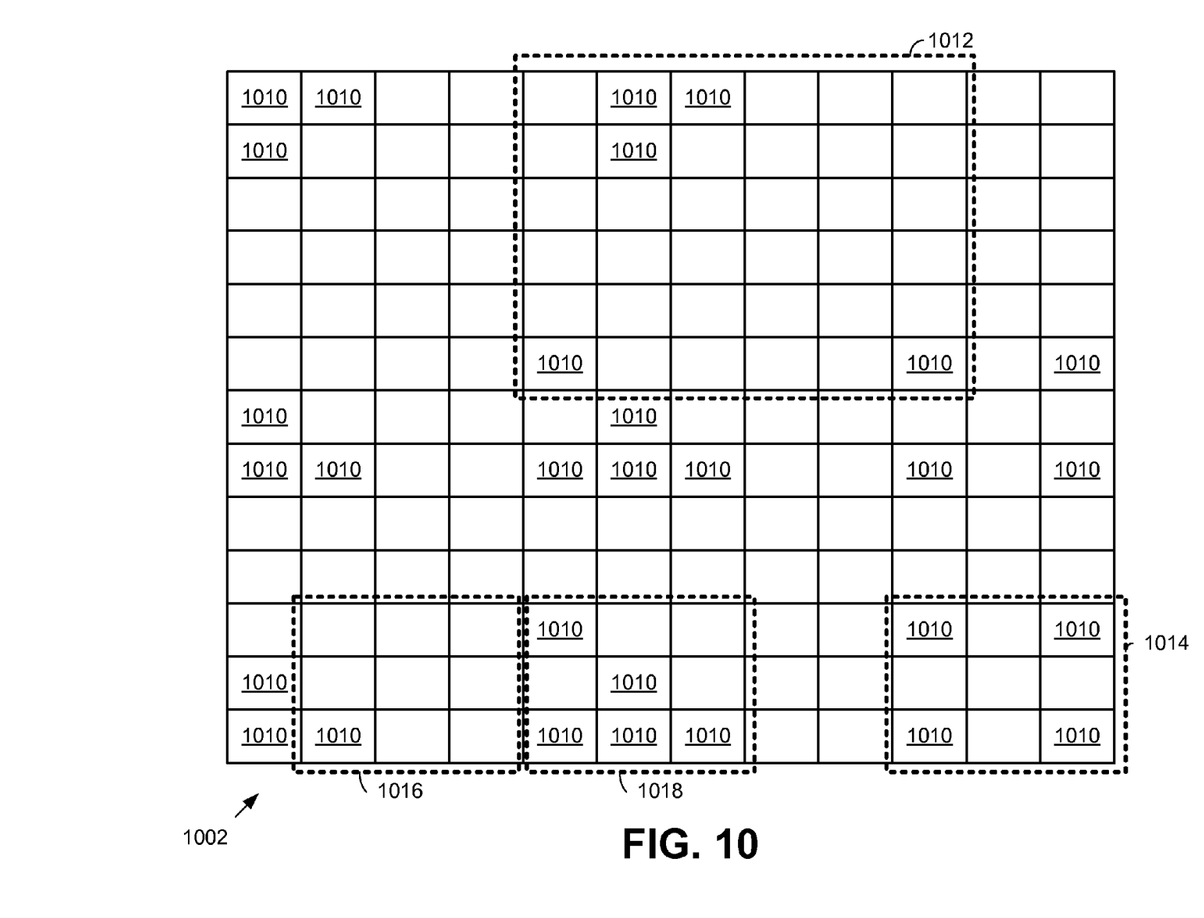
FIG. 10 is a block diagram illustrating map segment structure according to the present invention.

FIG. 10 is a block diagram illustrating map segment structure according to the present invention. A complete map 1002 includes a plurality of map sectors 1010. Not all of map sectors 1010 are numbered in FIG. 10. One or more map sectors 1010 may be combined to form a map segment by the map server, the map segment downloaded to a wireless terminal by the map server. The size of the map segment is determined based upon the map segment download request received from the wireless terminal, for example at Step 206 of FIG. 2 or Step 408 of FIG. 4. Based upon the contents of the map segment download request, e.g., location coordinates determined at step 202 and maximum data size determined at step 204, the map server creates a map segment of appropriate size and, in some cases, an appropriate level of geographic details. As shown, map segments 1014, 1016, and 1018 have a first number of map sectors 1010 included therewith. Further, map segment 1012 has a second number of map sectors 1012 included therewith. The level of geographic details may differ for each of the map segments 1012, 1014, 1016, and 1018.

As one of average skill in the art will appreciate, the term "substantially" or "approximately," as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the terms "communicatively coupled" or "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled." As one of average skill in the art will further appreciate, the term "compares favorably," as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The invention disclosed herein is susceptible to various modifications and alternative forms. Specific embodiments therefore have been shown by way of example in the drawings and detailed description. It should be understood, however, that the drawings and description thereto are not intended to limit the invention to the particular form disclosed, but on the contrary, the invention is to cover all modifications, equivalents, and alternatives falling within the spirit and scope of the present invention as defined by the claims.

The invention claimed is:

1. A wireless terminal comprising:
   a wireless interface;
   a user interface including a display;
   a Global Positioning System (GPS) receiver; and
   a processing unit communicatively coupled to the wireless interface, the user interface, and the GPS receiver and operable to:
   determine location coordinates of the wireless terminal;
   determine a maximum data size for a map segment download based upon at least a data size of available memory considering an estimated data size required for other application uses;
   transmit a map segment download request via a supporting wireless network infrastructure to a map server, the map segment download request including location coordinates of the wireless terminal and the maximum data size;
   receive a map segment via the supporting wireless network from the map server, the map segment having a level of resolution that is selected by the map server based upon the maximum data size; and
   display the map segment on the display.

2. The wireless terminal of claim 1, wherein the map segment includes a level of detail to meet the maximum data size.

3. The wireless terminal of claim 1, wherein the map segment has geographic boundaries to meet the maximum data size.

4. The wireless terminal of claim 1, wherein the map segment includes textual navigation information to meet the maximum data size.

5. The wireless terminal of claim 1, wherein the map segment is selected from a plurality of available map segments to meet the maximum data size.

6. The wireless terminal of claim 5, wherein the map segment includes a plurality of contiguous map sub-segments that make up the map segment.

7. A wireless terminal comprising:
   a wireless interface;
   a user interface including a display;
   a Global Positioning System (GPS) receiver; and
   a processing unit communicatively coupled to the wireless interface, the user interface, and the GPS receiver and operable to:
   determine location coordinates of the wireless terminal;
   determine a maximum data size for a map segment download based upon a data size of available memory considering an estimated data size required for other application uses;
   transmit a map segment download request via a supporting wireless network infrastructure to a map server, the map segment download request including location coordinates of the wireless terminal and the maximum data size;
   receive a map segment via the supporting wireless network from the map server, the map segment having a level of resolution that is selected by the map server based upon the maximum data size; and
   based upon user input, provide additional data with regard to a geographic feature identified on the map segment.

8. The wireless terminal of claim 7, wherein the map segment includes a level of detail to meet the maximum data size.

9. The wireless terminal of claim 7, wherein the map segment is selected from a plurality of available map segments to meet the maximum data size.

10. The wireless terminal of claim 7, wherein the map segment includes a plurality of contiguous map sub-segments that make up the map segment.

11. The wireless terminal of claim 7, wherein in providing additional data with regard to a geographic feature identified in the map segment the processing circuitry is operable to:
transmit a navigation information download request via the supporting wireless network infrastructure to a map server; and
receive the navigation information via the supporting wireless network from the map server that includes the additional data.

12. A premises wireless access point comprising:
a wireless interface; and
a processing unit communicatively coupled to the wireless interface and operable to:
establish wireless communications with a wireless terminal proximate to the premises wireless access point;
receive premises map data from a premises map server, wherein the premises map data comprises:
a plurality of points of interest within the premises; and
Global Positioning System (GPS) coordinates respective to the plurality of points of interest; and
transmit the premises map data to the wireless terminal.

13. The premises wireless access point of claim 12, wherein the processing unit is further operable to:
receive GPS coordinates from the wireless terminal; and
transmit the GPS coordinates to the premises map server.

14. The premises wireless access point of claim 13, wherein the map data is based upon the GPS coordinates received from the wireless terminal.

15. The premises wireless access point of claim 12, wherein the processing unit is further operable to:
receive a map segment download request from the wireless terminal, the map segment download request including GPS coordinates of the wireless terminal;
transmit the map segment download request to the map server that includes the GPS coordinates of the wireless terminal;
receive a map segment from the map server that corresponds to the GPS coordinates; and
transmit the map segment to the wireless terminal.

16. The premises wireless access point of claim 12, wherein the processing unit is further operable to:
receive a map segment download request from the wireless terminal, the map segment download request including a maximum data size;
transmit the map segment download request to the map server that includes the maximum data size;
receive a map segment from the map server that corresponds to the maximum data size; and
transmit the map segment to the wireless terminal.

17. A premises map server comprising:
a communications interface; and
a processing unit communicatively coupled to the communications interface and operable to:
establish communications with a wireless terminal via a premises wireless access point; and
download premises map data to the wireless terminal via the premises wireless access point, wherein the premises map data comprises:
a plurality of points of interest within the premises; and
Global Positioning System (GPS) coordinates respective to the plurality of points of interest.

18. The premises map server of claim 17, wherein the processing unit is further operable to:
receive Global Positioning System (GPS) coordinates from the wireless terminal; and
create the map data based upon the GPS coordinates of the wireless terminal.

19. The premises map server of claim 17, wherein the processing unit is further operable to:
receive a map segment download request from the wireless terminal via the premises wireless access point, the map segment download request including GPS coordinates of the wireless terminal;
create a map segment that corresponds to the GPS coordinates; and
transmit the map segment to the wireless terminal via the premises wireless access point.

20. The premises map server of claim 17, wherein the processing unit is further operable to:
receive a map segment download request from the wireless terminal via the premises wireless access point, the map segment download request including a maximum data size;
create a map segment that corresponds to the maximum data size; and
transmit the map segment to the wireless terminal via the premises wireless access point.

21. A premises map server comprising:
a communications interface; and
a processing unit communicatively coupled to the communications interface and operable to:
receive a map segment download request from a wireless terminal via at least a supporting wireless network infrastructure, the map segment download request including location coordinates of the wireless terminal;
send a maximum data size request to the wireless terminal;
receive a maximum data size response from the wireless terminal;
create navigation information that contains a map segment and that corresponds to the maximum data size response, the map segment having a level of resolution that is selected based upon the maximum data size; and
transmit the navigation information to the wireless terminal via the at least one supporting wireless network infrastructure.

22. The premises map server of claim 21, wherein the map segment has a level of resolution that is selected based upon the maximum data size response.

23. The premises map server of claim 21, wherein in creating the navigation information, the processing unit is operable to select a level of detail of the map segment based upon the maximum data size response.

24. The premises map server of claim 21, wherein in creating the navigation information the processing unit is operable to select geographic boundaries of the map segment based upon the maximum data size response.

25. The premises map server of claim 21, wherein in creating the navigation information, the processing unit is operable to select textual navigation information to be sent in conjunction with the map segment based upon the maximum data size response.

26. The premises map server of claim 21, wherein in creating the navigation information, the processing unit is operable to select the map segment from a plurality of available map segments based upon the maximum data size response.

27. The premises map server of claim 26, wherein in selecting the map segment from the plurality of available map segments to meet the maximum data size, the processing unit is operable to select a plurality of contiguous map sub-segments to make up the map segment.

* * * * *